US012595761B2

(12) United States Patent      (10) Patent No.:    US 12,595,761 B2

Juretzek et al.            (45) Date of Patent:      Apr. 7, 2026

(54) GENERATING ELECTRICAL ENERGY FROM HYDROGEN AND OXYGEN

(71) Applicant: Siemens Energy Global GmbH & Co. KG, Munich (DE)

(72) Inventors: Uwe Juretzek, Erlangen (DE); Carsten Graeber, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 78 days.

(21) Appl. No.: 18/286,126

(22) PCT Filed: Apr. 8, 2022

(86) PCT No.: PCT/EP2022/059372

§ 371 (c)(1),
(2) Date: Oct. 8, 2023

(87) PCT Pub. No.: WO2022/218841

PCT Pub. Date: Oct. 20, 2022

(65) Prior Publication Data

US 2024/0200472 A1     Jun. 20, 2024

(30) Foreign Application Priority Data

Apr. 15, 2021    (DE) ..................... 10 2021 203 730.5

(51) Int. Cl.
| | |
|---|---|
| *F02C 3/22* | (2006.01) |
| *F01K 23/10* | (2006.01) |

(Continued)

(52) U.S. Cl.
CPC ................ *F02C 3/22* (2013.01); *F01K 23/10* (2013.01); *F01K 25/005* (2013.01); *F02C 3/30* (2013.01);

(Continued)

(58) Field of Classification Search
CPC .. F02C 3/30; F02C 3/22; F01K 25/005; F01K 25/10

See application file for complete search history.

(56) References Cited

U.S. PATENT DOCUMENTS

| | | | | |
|---|---|---|---|---|
| 3,101,592 | A | * 8/1963 | Robertson | ............... C01B 3/065 |
| | | | | 60/39.463 |
| 4,148,185 | A | 4/1979 | Somers | |

(Continued)

FOREIGN PATENT DOCUMENTS

| | | | |
|---|---|---|---|
| CN | 105134318 A | 12/2015 | |
| CN | 211119284 U | * 7/2020 | |

(Continued)

OTHER PUBLICATIONS

PCT International Search Report and Written Opinion of International Searching Authority mailed Aug. 1, 2022 corresponding to PCT International Application No. PCT/EP2022/059372 filed Apr. 8, 2022.

*Primary Examiner* — Ted Kim
(74) *Attorney, Agent, or Firm* — Wolter Van Dyke Davis, PLLC

(57) ABSTRACT

A device and method for generating electrical energy from hydrogen and oxygen, includes a combustion engine, a heat recovery steam generator connected into the exhaust gas duct of the combustion engine, wherein the heat recovery steam generator has only one pressure stage. An $H_2$—$O_2$ reactor is provided to which steam from the heat recovery steam generator, water, oxygen and hydrogen are fed, such that, in the $H_2$—$O_2$ reactor, a reaction of oxygen and hydrogen forms steam, the water that is introduced is evaporated, additional steam is generated, the resultant superheated steam is fed to a steam turbine, and a generator connected to the steam turbine provides an electric power. High-pressure feed water is injected from the heat recovery (Continued)

steam generator into the $H_2$—$O_2$ reactor via a line to control the reaction in the $H_2$—$O_2$ reactor in a targeted manner and set the steam exit temperature from the $H_2$—$O_2$ reactor.

16 Claims, 4 Drawing Sheets

(51) Int. Cl.

| | | |
|---|---|---|
| *F01K 25/00* | (2006.01) | |
| *F02C 3/30* | (2006.01) | |
| *F22B 1/00* | (2006.01) | |
| *F22D 1/00* | (2006.01) | |
| *F22G 5/16* | (2006.01) | |

(52) U.S. Cl.

CPC .............. *F22B 1/003* (2013.01); *F22D 1/003* (2013.01); *F22G 5/16* (2013.01)

(56) References Cited

U.S. PATENT DOCUMENTS

| | | | | |
|---|---|---|---|---|
| 5,613,356 A | * | 3/1997 | Frutschi .................... | F02C 7/16 |
| | | | | 60/39.182 |
| 5,755,089 A | | 5/1998 | Vanselow | |
| 5,782,081 A | * | 7/1998 | Pak ........................... | F02C 3/34 |
| | | | | 60/39.181 |
| 5,953,900 A | * | 9/1999 | Bannister .............. | F01K 25/005 |
| | | | | 60/39.55 |
| 6,230,480 B1 | * | 5/2001 | Rollins, III .......... | F01K 23/106 |
| | | | | 122/7 B |
| 6,263,662 B1 | * | 7/2001 | Nagashima ............... | F02C 7/16 |
| | | | | 122/7 B |
| 12,092,021 B2 | * | 9/2024 | Partheepan ............... | F02C 1/00 |
| 2009/0056341 A1 | * | 3/2009 | Sanchez ................. | F22G 1/165 |
| | | | | 60/39.182 |
| 2011/0247335 A1 | | 10/2011 | Schmid | |
| 2019/0390577 A1 | | 12/2019 | Tanimura et al. | |

FOREIGN PATENT DOCUMENTS

| | | | | |
|---|---|---|---|---|
| DE | 4409196 A1 | 9/1995 | | |
| DE | 102010035487 A1 | 2/2012 | | |
| DE | 102011121341 A1 | 6/2013 | | |
| DE | 102015209812 A1 | 12/2016 | | |
| EP | 2368021 B1 | 1/2016 | | |
| JP | S5431814 A | 3/1979 | | |
| JP | H09510276 A | 10/1997 | | |
| JP | 2018123811 A | 8/2018 | | |
| WO | 9533128 A1 | 12/1995 | | |
| WO | WO-9731184 A1 | * | 8/1997 | .......... F01K 25/005 |
| WO | 2012013289 A2 | 2/2012 | | |

* cited by examiner

FIG 1

GENERATING ELECTRICAL ENERGY FROM HYDROGEN AND OXYGEN

CROSS REFERENCE TO RELATED APPLICATIONS

This application is the US National Stage of International Application No. PCT/EP2022/059372 filed 8 Apr. 2022, and claims the benefit thereof, which is incorporated by reference herein in its entirety. The International Application claims the benefit of German Application No. DE 10 2021 203 730.5 filed 15 Apr. 2021.

FIELD OF INVENTION

The invention relates to an apparatus for and to a method of generating electrical energy from hydrogen and oxygen.

BACKGROUND OF INVENTION

In conventional power plants, fossil fuels such as coal or hydrocarbons are combusted, which releases carbon dioxide ($CO_2$) into the atmosphere. Internationally, it is now a political aim to replace conventional power plants with clean power plants in the future, which at best do not have any $CO_2$ at all as a combustion product, and should also be free of further emissions, for example nitrogen oxides.

Hydrogen ($H_2$) is at the focus of development here since the combustion of hydrogen does not give rise to any carbon dioxide ($CO_2$) as a reaction product. However, whether hydrogen can be regarded as a largely $CO_2$-neutral fuel depends on the mode of production. Hydrogen which is produced by water electrolysis with the aid of power produced by renewable energies does not create $CO_2$ emissions and is commonly referred to as green hydrogen. In any case, the production of $CO_2$-neutral hydrogen is complex and costly.

Hydrogen is also required in alternative scenarios, for example in ammonia synthesis and subsequent fertilizer production. The demand for $CO_2$-neutral hydrogen is high and will increase further in the future. The supply, by contrast, is scarce, and it will be a scarce material even in the future. A power plant that uses hydrogen for generation of electrical energy will have to have a high efficiency to be able to be operated economically.

It can be assumed that electrical energy in the future will be generated largely from renewable sources such as the sun and wind. Conventional power plants will still have to be used here in particular when renewable energies are not available to a sufficient degree. For a conventional power plant, this means that the number of possible hours of operation will be greatly limited. Consequently, there will be a demand for such a power plant at favorable specific capital costs.

There are already known internal combustion engines, for example gas turbines or gas motors, in which hydrogen or a mixture of hydrogen and natural gas is combusted with air for power generation. With these internal combustion engines, there are also implementable power plant concepts that also use the waste heat from the exhaust gas of the internal combustion engine via conventional steam circuits. However, the efficiencies are currently lower compared to gas and steam power plants fired with pure natural gas.

Also known are fuel cells where the electrical energy is generated by use of hydrogen. However, fuel cells now have very high specific capital costs compared to internal combustion engines. Nor can it be expected that this will change in the future. The comparatively higher efficiency compared to internal combustion engines is unlikely to be relevant in grid-coupled power plants since there are too few hours of operation for economic viability.

SUMMARY OF INVENTION

It is an object of the invention to specify an apparatus and a method for a green energy generation concept that combines very high efficiency with simultaneously lowest specific capital costs, is largely free of emissions and is usable flexibly.

The object of the invention directed to an apparatus is achieved by the features of the independent claim.

The apparatus of the invention for generating electrical energy from hydrogen and oxygen comprises an internal combustion engine, especially a gas turbine, and a waste heat steam generator which is connected to the exhaust gas duct of the internal combustion engine and has only one pressure stage. The invention also provides an $H_2$—$O_2$ reactor which can be fed with steam from the waste heat steam generator, water, oxygen and hydrogen, such that, in the $H_2$—$O_2$ reactor, a reaction of oxygen and hydrogen to give steam is achievable, in which the water introduced evaporates, wherein additional steam is generatable, wherein the resulting greatly superheated steam can be fed to a steam turbine, and a generator connected to the steam turbine can provide an electrical power, and, for control of the reaction in the $H_2$—$O_2$ reactor and for adjustment of the steam exit temperature from the $H_2$—$O_2$ reactor, high-pressure feed water (14) from the waste heat steam generator can be sprayed into the $H_2$—$O_2$ reactor via a conduit.

The invention proceeds here from the consideration of using a conventional gas turbine or gas motor and a conventional waste heat steam generator. The internal combustion engine may be fired here wholly with hydrogen or partly with hydrogen and natural gas. The waste heat steam generator has only one pressure stage and hence has only one pressure level. It is designed such that only moderately superheated steam or else only saturated steam is generated.

Also provided in accordance with the invention is an $H_2$—$O_2$ reactor which causes hydrogen and oxygen to react in a steam atmosphere provided by the waste heat steam generator. This reaction leads to the combustion product steam. Thus, combustion product and circulation medium in the steam circuit of the waste heat steam generator are of the same type.

The invention recognizes, in a particular manner, that a conventional gas turbine and a conventional waste heat steam generator that provides slightly superheated steam at one pressure level, in conjunction with an $H_2$—$O_2$ reactor, can generate greatly superheated steam and, at the same time, the heat in the offgas can be exploited in an ideal manner. The steam formed in the reaction of hydrogen and oxygen, which is at high pressure and temperature, is introduced into the steam circuit and can be exploited as circulation medium down to the level defined in the condenser.

In the case of only partial replacement of natural gas by hydrogen as fuel, the invention makes it possible to use the hydrogen when it has the greatest benefit. Use of hydrogen in the steam circuit allows the efficiency based on that mass flow of fuel to be very distinctly increased compared to use in the gas turbine.

In the operation of the $H_2$—$O_2$ reactor, maximum completeness of conversion of hydrogen in particular and of oxygen to a somewhat lower degree should be ensured. Hydrogen can adversely affect the properties of the material used in the steam turbine by hydrogen embrittlement and lead to corrosion. In order to assure maximum completeness of conversion of hydrogen, the apparatus is preferably controlled such that there is a certain excess of oxygen. Any excess oxygen can preferably be conveyed out by the vacuum system at the condenser of the steam circuit. Alternatively, excess oxygen can also be removed by other measures, for example membrane degassers, in order to largely remove oxygen in other regions of the steam circuit. Especially when the waste heat steam generator has an upstream preheating zone for cold feed water, there is the need in this region too to remove uncondensable gases from the circuit.

For control of the reaction in the $H_2$—$O_2$ reactor, feed water can be sprayed into the $H_2$—$O_2$ reactor from the waste heat steam generator via a conduit. The injection of feed water allows controlled influence of the reaction in the $H_2$—$O_2$ reactor. This can prevent flashbacks, for example, and allows control of the steam temperature at the reactor exit. For this purpose, the feed water is injected into the $H_2$—$O_2$ reactor at a suitable point (for example in the reaction zones of hydrogen and oxygen or in a mixing zone at the reactor exit). The feed water is high-pressure feed water from the waste heat steam generator, preferably from the economizer exit.

For the purpose of increasing the performance, it may additionally be advantageous to mix in cold feed water that has been withdrawn upstream of the waste heat steam generator. The cold feed water is therefore advantageous especially because, depending on the power plant design, for example the required fresh steam parameters, the waste heat from the gas turbine offgas has already been optimally exploited and no further heat is available, but a correspondingly further-increased steam turbine output is desired. Although mixing in cold feed water has an adverse effect on efficiency, this is accepted for lowering of the specific capital costs.

The waste heat steam generator may be designed, for example, as a natural circulation type or else as a forced circulation type. The latter, specifically in the case of very high evaporation pressures, promises elevated plant flexibility (e.g. shortened startup times).

In order to increase the efficiency of the plant, it is possible to use one or more taps in the steam turbine that heat up condensate and/or feed water by means of corresponding heat exchangers with low-value steam, and hence make it possible to produce more high-value steam in the waste heat steam generator and/or in the $H_2$—$O_2$ reactor.

In a particular development of the invention, a heat remover in the form of a heat exchanger is incorporated upstream of the condenser. The heat remover, for absorption of heat, is connected here on the primary side to the steam conduit between the steam turbine and a condenser connected downstream of the steam turbine. For release of heat, the heat remover is connected on the secondary side to the conduit for feeding of additional feed water not preheated in the waste heat steam generator into the $H_2$—$O_2$ reactor. The heat remover is required when the $H_2$—$O_2$ reactor generates very high fresh steam parameters of, for example, 1300° C. and pressure 150 bar. At the steam turbine exit, the steam is then still highly superheated, having been subjected to removal of heat by the heat remover, before being condensed in the condenser. Given very highly selected fresh steam pressures and temperatures, it may be advantageous to design the waste heat steam generator as a forced circulation tank rather than as a natural circulation (drum) tank.

The evaporation pressure in the waste heat steam generator is preferably set only at such a high level that, depending on the fresh steam temperature established via the $H_2$—$O_2$ reaction, wetness at the steam turbine exit is avoidable. The superheating in the waste heat steam generator is chosen only at such a high level that the heat from the offgas is exploited optimally without additional evaporator pressure stages. Since the focus is on the optimal exploitation of the heat from the offgas and, at the same time, a very simple and inexpensive concept is to be implemented, the evaporation pressure, depending on the fresh steam temperature set via the $H_2$—$O_2$ reaction, is chosen only at such a high level that there is no wetness problem leading to blade erosion at the respective condenser pressure even without intermediate superheating at the steam turbine exit.

A further advantageous embodiment of the invention further comprises an electrically operated superheater which is connected upstream of the $H_2$—$O_2$ reactor and by means of which, when the $H_2$—$O_2$ reactor is not in operation, the fresh steam temperature of the steam can be increased to such an extent that wetness at the steam turbine exit is avoided. With regard to the hydrogen infrastructure which is currently still inadequate, and possibly resultant hydrogen shortages, it may be advantageous when there is an option provided in the circuit in which further operation of the $H_2$—$O_2$ reactor is assured even without hydrogen/oxygen supply.

In an advantageous development of the invention, the waste heat steam generator has heating surfaces that form a first evaporator and a second evaporator, and heating surfaces that form a first superheater, wherein the first superheater is disposed between the heating surfaces of the first evaporator and of the second evaporator, so as to avoid any potential delay on startup of the gas turbine. This offers the advantage that the gas turbine can always be started up at full gradient, even when the waste heat steam generator is at ambient pressure and the superheater is still dry and hence uncooled.

In principle, it is also advantageously possible to release the steam generated by the $H_2$—$O_2$ reactor to a district heating grid. For this purpose, the steam turbine should be correspondingly equipped with taps or, if necessary, should be designed as a backpressure turbine.

The object of the invention directed to a method is achieved by the features as claimed. The inventive advantages of the apparatus are likewise applicable to the method.

The method of the invention for generating electrical energy from hydrogen and oxygen comprises an internal combustion engine, especially a gas turbine, and a waste heat steam generator which is connected to the exhaust gas duct of the internal combustion engine and has only one pressure stage.

Additionally provided is an $H_2$—$O_2$ reactor which is fed with steam from the waste heat steam generator, water, oxygen and hydrogen, such that, in the $H_2$—$O_2$ reactor, oxygen and hydrogen are reacted to give steam, and further steam is formed by the evaporation of the water injected, wherein the steam is fed to a steam turbine, and a generator connected to the steam turbine generates electrical power.

The reaction in the $H_2$—$O_2$ reactor is preferably controlled by spraying feed water into the $H_2$—$O_2$ reactor from the waste heat steam generator via a conduit.

Preference is given to using high-pressure feed water from the economizer exit of the waste heat steam generator.

Given very high steam parameters downstream of the $H_2$—$O_2$ reactor (e.g. 150 bar and) 1300° ° C., a heat remover is preferably integrated upstream of the condenser in the steam circuit, which is designed as a heat exchanger which is connected on the primary side to the steam conduit between the steam turbine and a condenser connected downstream of the steam turbine, in order to absorb heat, and is connected on the secondary side to a conduit, in order to release heat.

Also advantageous are one or more condensate/feed water preheaters, where the efficiency is increased by withdrawing steam from one or more taps in the steam turbine and feeding it to the preheaters for the purpose of heating.

The evaporation pressure in the waste heat steam generator is preferably set only at such a high level that, depending on the fresh steam temperature established via the $H_2$—$O_2$ reaction, wetness at the steam turbine exit is avoided even without intermediate superheating.

In a particular development, in addition, an electrically operated superheater is provided upstream of the $H_2$—$O_2$ reactor, by means of which the fresh steam temperature of the steam can be increased if required ($H_2$—$O_2$ reactor in operation only with reduced power, if at all) such that wetness at the steam turbine exit is avoided.

In a particular embodiment of the invention, the waste heat steam generator has heating surfaces that form a first evaporator and a second evaporator, and heating surfaces that form a first superheater, wherein the first superheater is disposed between the heating surfaces of the first evaporator and of the second evaporator, so as to avoid any potential delay on startup of the gas turbine.

The invention has a number of advantages over a conventional gas and steam power plant that uses hydrogen wholly or partly as fuel for the gas turbine:

Efficiency in general and especially in the case of only partial replacement of natural gas by hydrogen is higher than in the case of a gas and steam power plant based on the same gas turbine. This arises from the fact that fresh steam pressure and temperature can be chosen at a higher level than would be possible by virtue of the offgas temperature level of the gas turbine, the heat present in the gas turbine offgas is exploited better, i.e. the offgas temperature at the chimney exit is lower, the steam at high pressure and temperature which is formed in the reaction of hydrogen and oxygen can be regarded as circulation medium and in this respect can be exploited down to the level defined in the condenser, in the case of elevated hydrogen contents in the gas turbine fuel gas by comparison with natural gas, the combustion temperature now has to still be distinctly lowered in order to keep control of flashback, nitrogen oxide emissions, etc. The temperature in the reactor, by contrast, is much lower and can additionally be controlled very accurately by the injection of feed water, i.e. the potential of hydrogen firing can be better exploited.

in the case of only partial replacement of natural gas as fuel, hydrogen is used when it has the greatest benefit. As a result of use of hydrogen in the steam circuit, the efficiency based on this fuel mass flow rate is more than 50%, which is very clearly above the efficiency of gas turbines.

The power is actually very distinctly increased by comparison and may be increased even further with partial sacrificing of the efficiency advantage over the gas and steam power plant. For the purpose of improving specific costs, given that fresh steam parameters can nowadays be established without difficulty and efficiency is still similar to gas and steam power plants, it is possible to more than double the performance of the steam turbine and it hence surpasses the performance component of the gas turbine.

The improved power and efficiency by comparison is achieved with roughly equal costs, since savings and extra costs are roughly balanced. This can be illustrated as follows with regard to savings:

There is only one pressure stage (rather than multiple pressure stages as usually customary in the gas and steam power plant) in the waste heat steam generator made of inexpensive steel, and no costly high-temperature heating surfaces for superheaters or intermediate superheaters. There is thus also no need for corresponding final and intermediate injections.

There is only one, comparatively cold fresh steam conduit (rather than multiple fresh steam conduits and additionally often also low- and high-temperature intermediate superheating as in the case of the gas and steam power plant) (which is thus made of cheap steel) from the tank to the $H_2$—$O_2$ reactor, which is preferably disposed as close as possible to the steam turbine in order to keep the high-temperature-capable fresh steam conduit that it requires downstream as short as possible.

No demineralization water treatment plant is required for the circulation water additional supply. This power plant with the corresponding recooling system is basically not just a water-free power plant, but actually one that produces water. This is true when the hydrogen- and oxygen-producing electrolyzer that requires water as raw material is not operated on site, or if blue hydrogen is used in combination with oxygen obtained from air.

The invention may require, as well as the $H_2$—$O_2$ reactor, as an additional element, adaptations to the turbo set of the steam turbine and to the circulation pumps (elevated high-pressure steam mass flow rate), an oxygen provision system and an enlargement of the recooling system.

The enlargement of the recooling system in the case of air condensers and once-through coolers with limited heating span can be made up for wholly or partly by the comprehensive utilization of eco bypass switches in the tank which is possible by virtue of the injection process, since a large amount of heat can be removed via the offgas during the steam bypass operation that otherwise determines the design.

A further advantage arises by virtue of the distinct improvement in flexibility over a gas and steam power plant. This arises for reasons including the following:

Since the first heating surface exposed to the hot offgas stream from the gas turbine is not, as has been the case to date, a superheater heating surface which is uncooled during the startup operation but rather a constantly cooled evaporator heating surface, the gas turbine can be started up at full gradient even when the tank is cold; this results in a corresponding shortening of the startup time.

Rapid shutdown of the power plant is possible with distinctly lower stress on the tank, since the superheater heating surface is either not present at all or is preferably disposed between the evaporator heating surfaces. Thus, it does not come into contact with cold offgas/air during and directly after the shutdown; there is thus no need for the possible "quenching" of the superheater heating surface.

The high-temperature region ($H_2$—$O_2$ reactor, steam turbine inlet including valves, connecting pipelines) is spatially highly constricted and is thus particularly suitable for being kept warm on shutdown by means of heating mats. The steam turbine can thus be started up at a very early stage; this helps to achieve very good control of the temperature of the fresh steam entering the steam turbine via the $H_2$—$O_2$ reactor.

The possibility of temperature adjustment via the $H_2$—$O_2$ reactor and control of the water injection rate in the latter offer further very rapid means of load control (in relation to overload as well).

Overall, the steam portion, which has to date been relatively sluggish, thus reacts similarly quickly to the gas turbine and can contribute to the increase in power of the power plant even without the gas turbine. This circumstance can also have a very positive effect specifically in the case of retrofitting, since the reason for the choice of an open gas turbine process was often originally the associated flexibility.

A further important advantage of this concept by comparison with wholly or partly hydrogen-fired gas turbines and gas and steam power plants based thereon with a conventional steam circuit, and also otherwise in all other processes that burn hydrogen with atmospheric oxygen, is that the water formed in the reaction of hydrogen and oxygen is not lost into the atmosphere and in this respect, specifically in the case of water scarcity, the valuable resource of water is available for other uses. A further advantage over the aforementioned atmospheric oxygen for processes that use hydrogen combustion is that the absence of nitrogen means that there is also no formation of nitrogen oxides that are released into the atmosphere.

BRIEF DESCRIPTION OF THE DRAWINGS

The invention is described in detail hereinafter by figures. The figures show:

FIG. 1: An apparatus of the invention for generation of electrical energy from hydrogen and oxygen

DETAILED DESCRIPTION OF INVENTION

Figure 1:
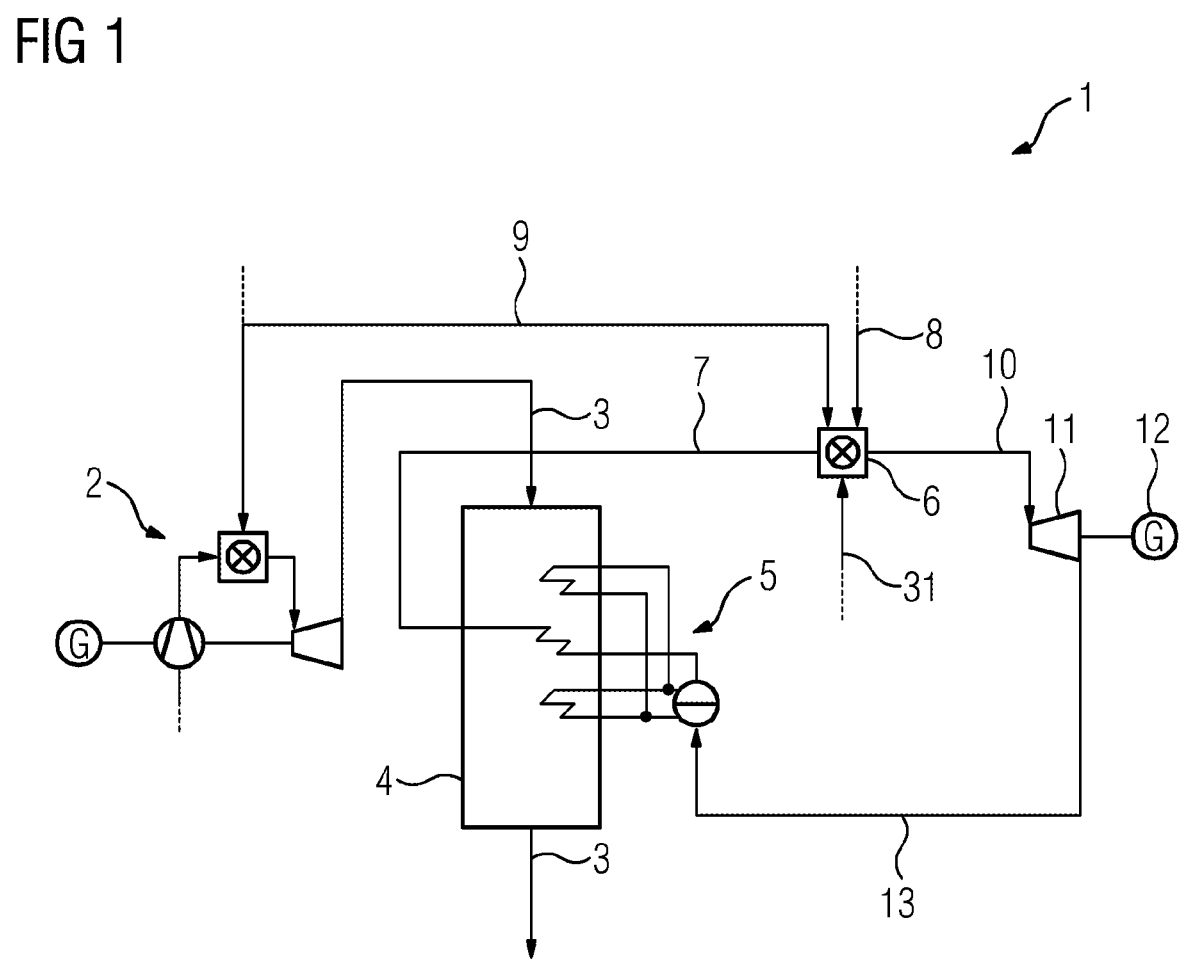
Figure 2:
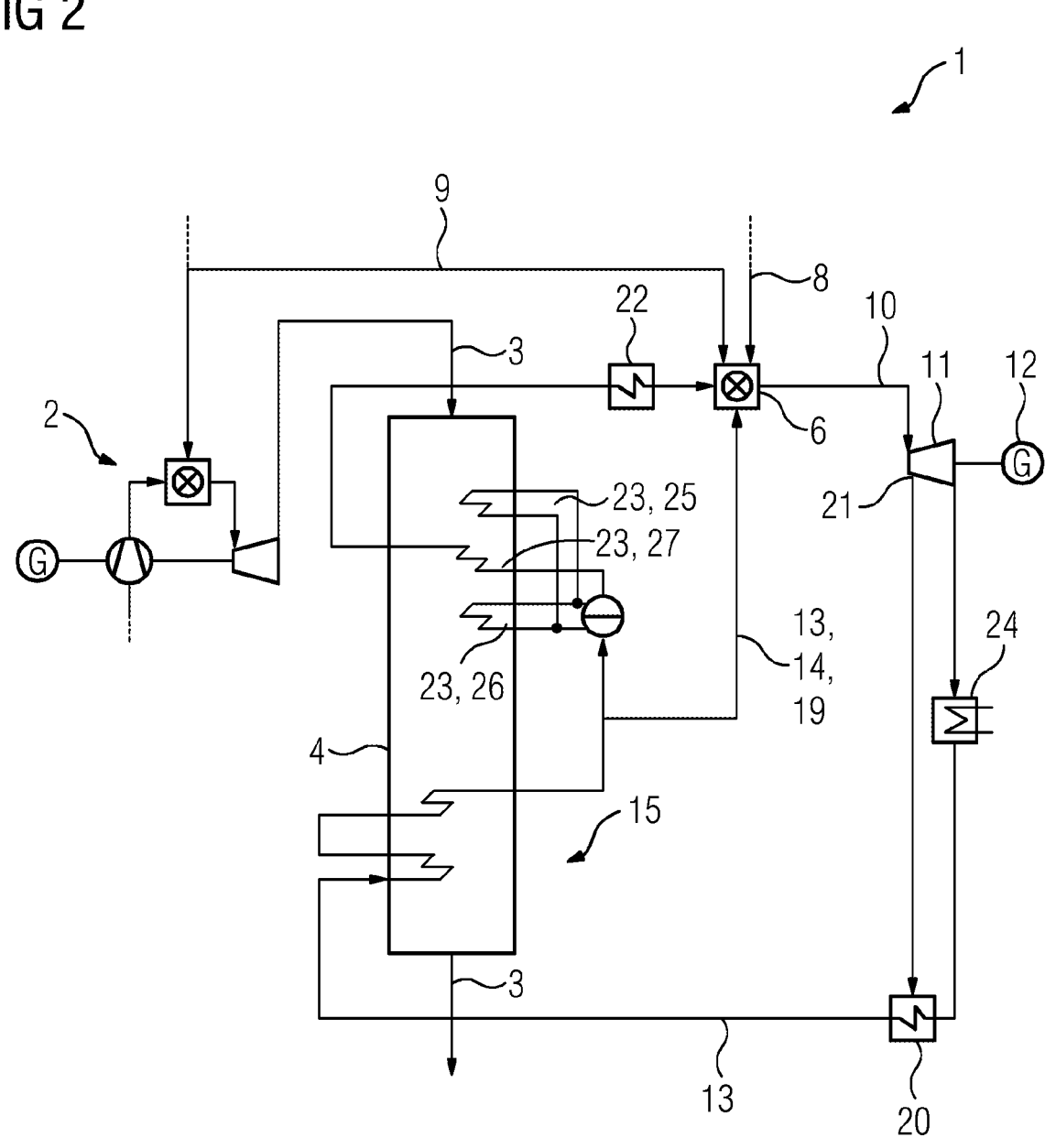
FIG. 2: A collection of multiple developments of the apparatus of the invention

FIG. 1 shows the inventive apparatus 1 for generation of electrical energy from hydrogen and oxygen. The apparatus comprises a gas turbine 2, a waste heat steam generator 4 connected to the offgas duct 3 of the gas turbine, an $H_2$—$O_2$ reactor 6 and a steam turbine 11. The gas turbine 2 and the waste heat steam generator 4 are conventional components. The gas turbine 2 may be fired wholly with hydrogen or partly with hydrogen and natural gas. The waste heat steam generator 4 is designed such that it has just one pressure stage 5 and delivers slightly superheated steam. The $H_2$—$O_2$ reactor 6 can be fed with steam 7 from the waste heat steam generator 4, oxygen 8, hydrogen 9 and water 31 via separate conduits.

The $H_2$—$O_2$ reactor is designed such that a reaction of oxygen 8 and hydrogen 9 to give steam 10 is achievable therein. This reaction leads to the combustion product steam. The steam 10 is greatly superheated (with establishment of a permissible steam temperature by addition of steam 7 and water 31) and is fed to the steam turbine 11 via a steam conduit 10. The steam turbine 11 is connected to a generator 12 that can provide electrical power. The steam formed in the reaction of hydrogen and oxygen, which is at high pressure and temperature, is thus introduced into the steam circuit and can be exploited as circulation medium down to the level defined in the condenser. The better exploitation of heat allows the offgas temperature at the chimney exit to be lower. Use of hydrogen in the steam circuit allows the efficiency based on that mass flow of fuel to be very distinctly increased compared to use in the gas turbine.

FIG. 2 shows multiple developments of the apparatus of the invention. The developments may be implemented here in combination or separately from one another.

For control of the reaction and increase in power in the $H_2$—$O_2$ reactor 6, feed water 13 from the waste heat steam generator 4 is injected into the $H_2$—$O_2$ reactor 6 via a conduit 19. The feed water 13 may be here high-pressure feed water 14, which is advantageously withdrawn at the exit from the economizer 15 of the waste heat steam generator 4.

To further increase the efficiency, a condensate preheater 20 is additionally provided in FIG. 2, upstream of the waste heat steam generator 4 for preheating of feed water 13. The condensate preheater 20 is heated with steam which is withdrawn from one or more taps 21 in the steam turbine 11.

In order to be able to increase the fresh steam temperature of the steam if required (for example when the $H_2$—$O_2$ reactor is out of operation) to such an extent that wetness is avoided at the exit from the steam turbine 11, an electrically operated superheater 22 is also provided in FIG. 2, upstream of the $H_2$—$O_2$ reactor 6. The electrically operated superheater 22 makes it possible to ensure further operation of the $H_2$—$O_2$ reactor even without hydrogen/oxygen supply.

In order to avoid any potential delay on startup of the gas turbine 2, a superheater 27 is provided in FIG. 2, disposed between the heating surfaces 23 of the first evaporator 25 and of the second evaporator 26. This offers the advantage that the gas turbine 2 can always be started up at full gradient, even when the waste heat steam generator 4 is at ambient pressure and the superheater 27 is still dry and hence uncooled.

Figure 3:
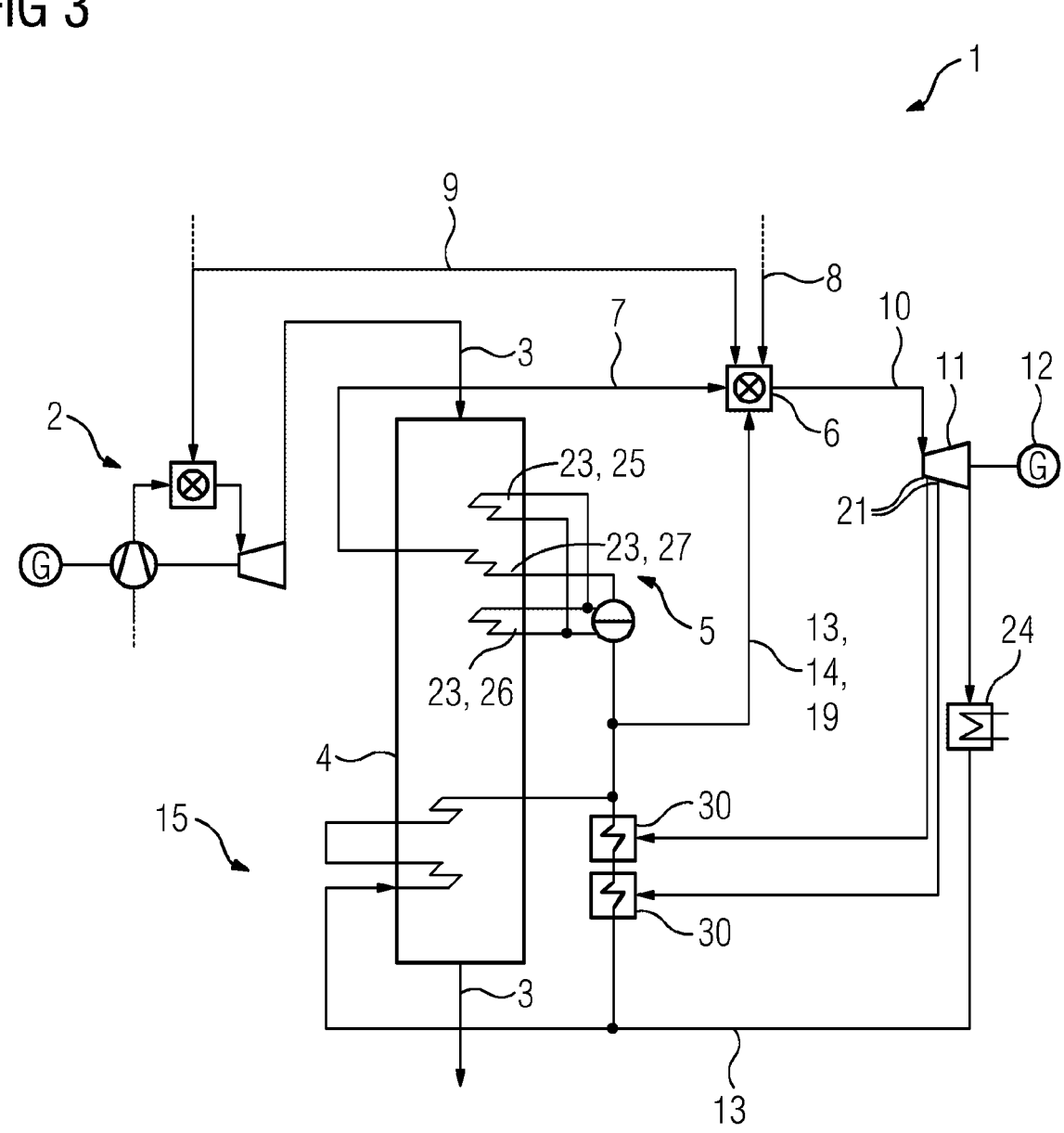
FIG. 3: A development of the apparatus of the invention with separate preheaters

FIG. 3 is based on the inventive design according to FIG. 1. FIG. 3 shows a development of the apparatus of the invention with separate preheaters 30 connected to taps on the steam turbine 11.

Figure 4:
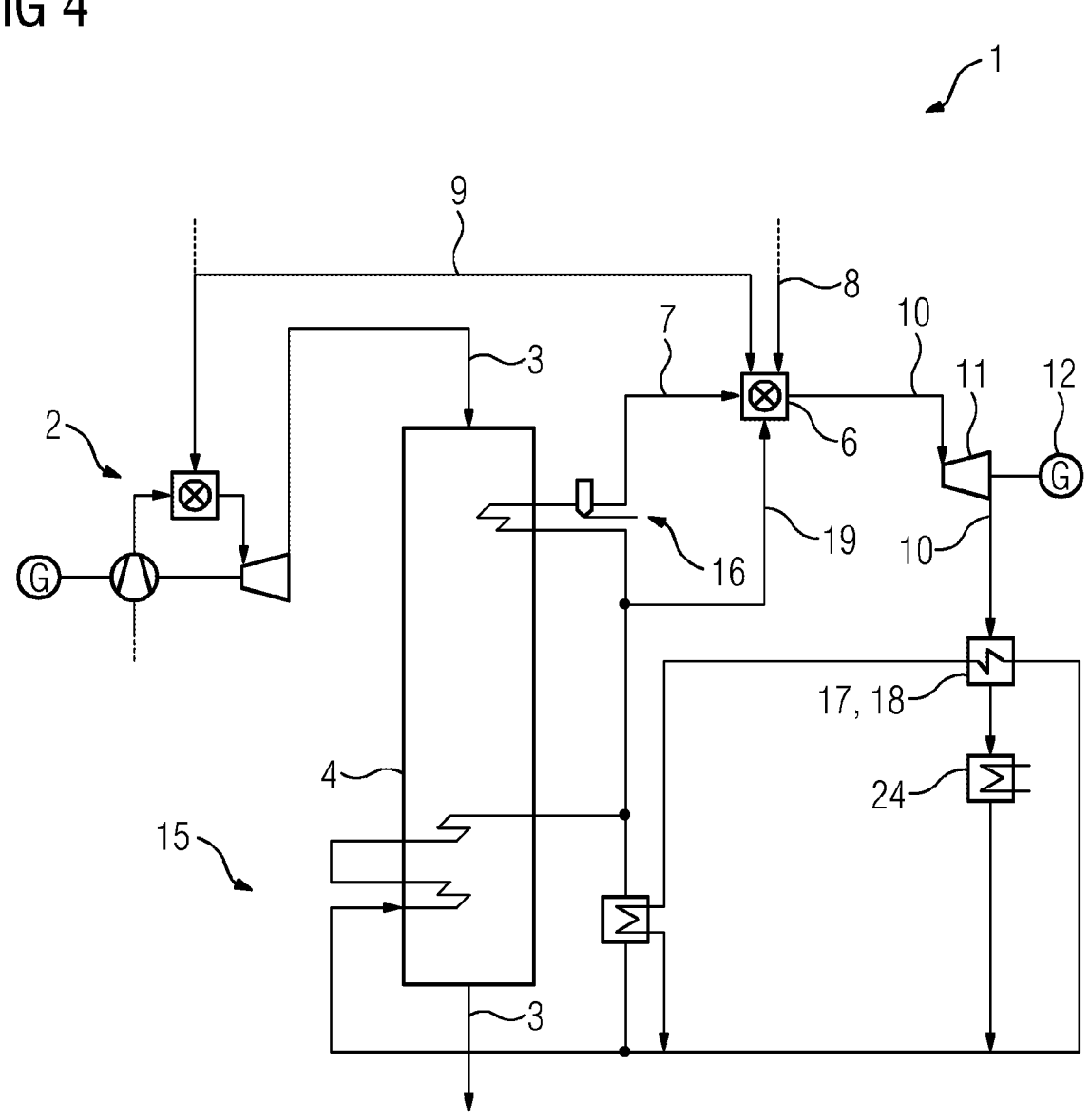
FIG. 4: A development of the apparatus of the invention with a once-through steam generator

FIG. 4 is based largely on FIG. 1. FIG. 4 shows a development of the apparatus of the invention with a once-through steam generator 16 and a heat remover 17. Given very highly selected fresh steam pressures and temperatures, it is advantageous to design the waste heat steam generator 4 as a forced circulation tank rather than as a natural circulation (drum) tank. The heat remover 17 is designed as a heat exchanger 18 which, for energy absorption, is connected on the primary side to the steam conduit 10 between the steam turbine 11 and a condenser 24 connected downstream of the steam turbine 11, and, for energy release, on the secondary side is connected to the conduit 19 for feeding feed water from the waste heat steam generator 4 into the $H_2$—$O_2$ reactor 6. The heat remover 17 is required when the $H_2$—$O_2$ reactor 6 generates very high fresh steam parameters of, for example, e.g. 1300° ° C. and pressure 150 bar. At the exit from the steam turbine 11, the steam is then still highly superheated, having been subjected to removal of heat by the heat remover 17, before it is condensed in the condenser 24.

The invention claimed is:

1. An apparatus for generating electrical energy from hydrogen and oxygen, comprising:
    an internal combustion engine, and a waste heat steam generator (WHSG) connected to an exhaust gas duct of the internal combustion engine, where the waste heat steam generator has only one pressure stage, an H2-O2 reactor, which is fed with WHSG steam from the waste heat steam generator, high-pressure feed water from the waste heat steam generator, oxygen and hydrogen, wherein in the H2-O2 reactor a reaction of oxygen and hydrogen produces additional steam and the high-pressure feed water evaporates into further steam, wherein the WHSG steam, the additional steam, and the further steam together form a greatly superheated steam that is fed to a steam turbine, and a generator connected to the steam turbine provides an electrical power, wherein, for control of the reaction in the H2-O2 reactor and for adjustment of a steam exit temperature from the H2-O2 reactor, the high-pressure feed water from the waste heat steam generator is sprayed into the H2-O2 reactor via a feed water conduit, wherein all WHSG steam exiting the waste heat steam generator is uncooled enroute to the H2-O2 reactor, and wherein expanded steam exits the steam turbine and is condensed before reaching the waste heat steam generator.

2. The apparatus as claimed in claim 1, further comprising:

a heat remover designed as a heat exchanger which is connected on a primary side to a steam conduit that connects the steam turbine to a condenser disposed downstream of the steam turbine, and which is connected on a secondary side to the feed water conduit.

3. The apparatus as claimed in claim 1, further comprising:

a condensate preheater connected upstream of the waste heat steam generator and configured to preheat the feed water, wherein steam is withdrawn from one or more taps on the steam turbine and is fed to the condensate preheater.

4. The apparatus as claimed in claim 1, wherein an evaporation pressure in the waste heat steam generator is set only sufficiently high that, depending on a fresh steam temperature set via the H2-O2 reaction, wetness at an exit from the steam turbine is avoided even without intermediate superheating.

5. The apparatus as claimed in claim 1, further comprising:

an electrically operated superheater which is connected upstream of the H2-O2 reactor and downstream of the waste heat steam generator, and by means of which a fresh steam temperature of the steam when the H2-O2 reactor is not in operation is increased to such an extent that wetness is avoided at an exit from the steam turbine.

6. The apparatus as claimed in claim 1, wherein the waste heat steam generator has heating surfaces that form a first evaporator and a second evaporator, and heating surfaces that form a first superheater, wherein the first superheater is disposed between the heating surfaces of the first evaporator and of the second evaporator, so as to avoid any potential delay on startup of the internal combustion engine.

7. The apparatus of claim 1, wherein the internal combustion engine comprises a gas turbine.

8. The apparatus of claim 1, wherein the H2-O2 reactor is configured to control the reaction and to adjust the steam exit temperature of the H2-O2 reactor by injecting the high-pressure feed water directly into a combustion zone of the H2-O2 reactor.

9. A method of generating electrical energy from hydrogen and oxygen, comprising an internal combustion engine, a waste heat steam generator (WHSG) which is connected to an exhaust gas duct of the internal combustion engine and which has only one pressure stage, and an H2-O2 reactor, the method comprising:

feeding the H2-O2 reactor with WHSG steam from the waste heat steam generator, with high-pressure feed water from the waste heat steam generator, with oxygen, and with hydrogen, wherein in the H2-O2 reactor a reaction of oxygen and hydrogen produces additional steam and the high-pressure feed water evaporates into further steam, and wherein the WHSG steam, the additional steam, and the further steam together form a greatly superheated steam that is fed to a steam turbine, and wherein all the WHSG steam exiting the waste heat steam generator is uncooled enroute to the H2-O2 reactor, feeding the greatly superheated steam to a steam turbine, condensing expanded steam that has exited the steam turbine before the expanded steam that has exited the steam turbine reaches the waste heat steam generator, and generating electrical power by a generator connected to the steam turbine, and controlling the reaction in the H2-O2 reactor and a steam temperature at an exit from the H2-O2 reactor by spraying the high-pressure feed water as water from the waste heat steam generator into the H2-O2 reactor via a feed water conduit.

10. The method as claimed in claim 9, further comprising:

a heat remover designed as a heat exchanger to absorb heat which is connected on a primary side to a steam conduit that connects the steam turbine to a condenser disposed downstream of the steam turbine, in order, and which is connected on a secondary side to the feed water conduit, in order to release heat.

11. The method as claimed in claim 9, further comprising:

a condensate preheater which is connected upstream of the waste heat steam generator and by which feed water is preheated, wherein, steam is withdrawn from one or more taps on the steam turbine and is fed to the condensate preheater.

12. The method as claimed in claim 9, wherein an evaporation pressure in the waste heat steam generator is set only sufficiently high that, depending on a fresh steam temperature set via the H2-O2 reaction, wetness at an exit from the steam turbine is avoided even without intermediate superheating.

13. The method as claimed in claim 9, further comprising:

an electrically operated superheater which is connected upstream of the H2-O2 reactor and downstream of the waste heat steam generator, and by means of which a fresh steam temperature of the steam when the superheater is not in operation can be increased to such an extent that wetness is avoided at an exit from the steam turbine.

14. The method as claimed in claim 9, wherein the waste heat steam generator has heating surfaces that form a first evaporator and a second evaporator, and heating surfaces that form a first superheater, wherein the first superheater is disposed between the heating surfaces of the first evaporator and of the second evaporator, so as to avoid any potential delay on startup of the internal combustion engine.

15. The method of claim 9, wherein the internal combustion engine comprises a gas turbine.

16. The method of claim 9, wherein the H2-O2 reactor is configured to control the reaction and to adjust the steam temperature at the exit of the H2-O2 reactor by injecting the high-pressure feed water directly into a combustion zone of the H2-O2 reactor.

* * * * *